UNITED STATES PATENT OFFICE.

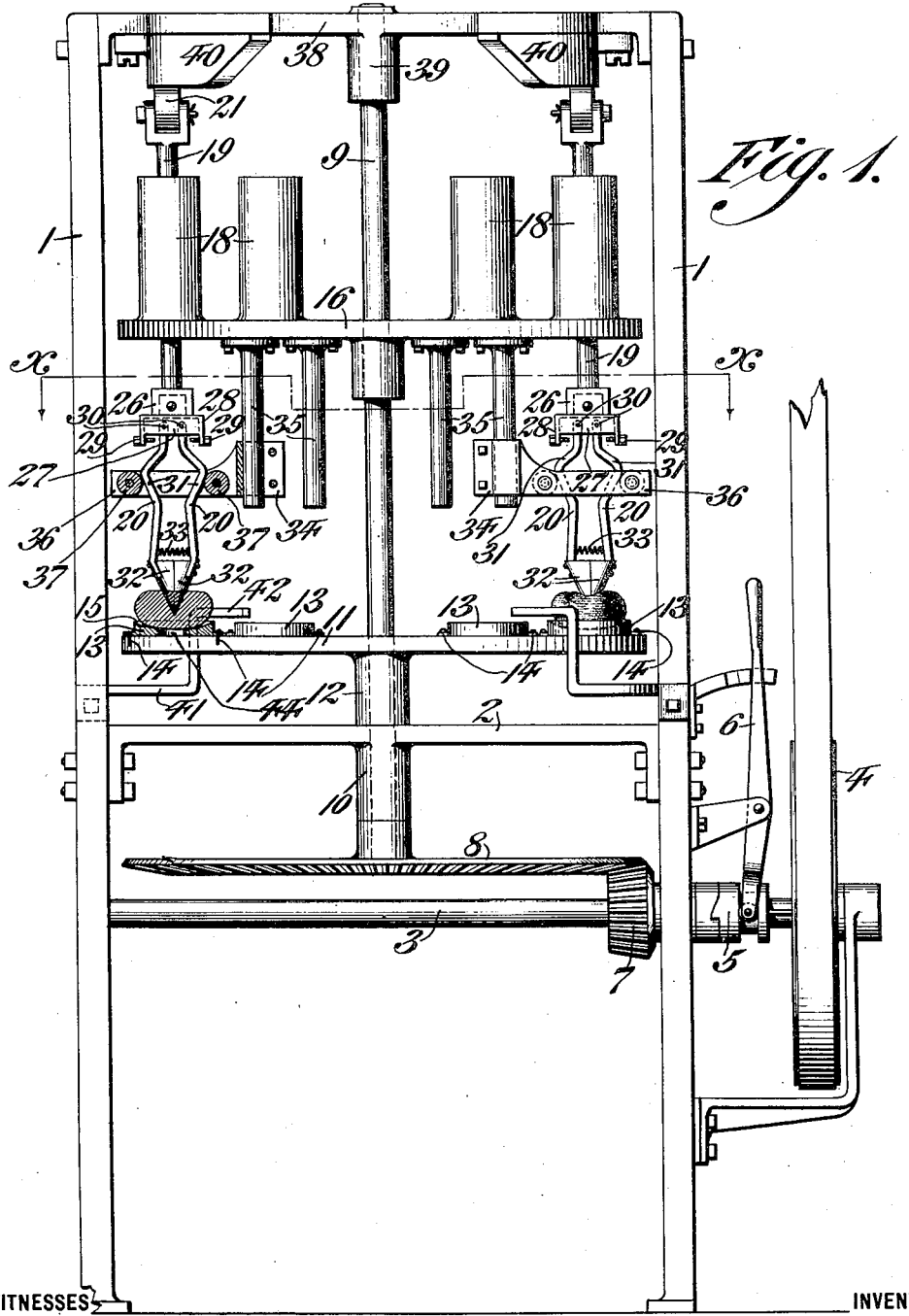

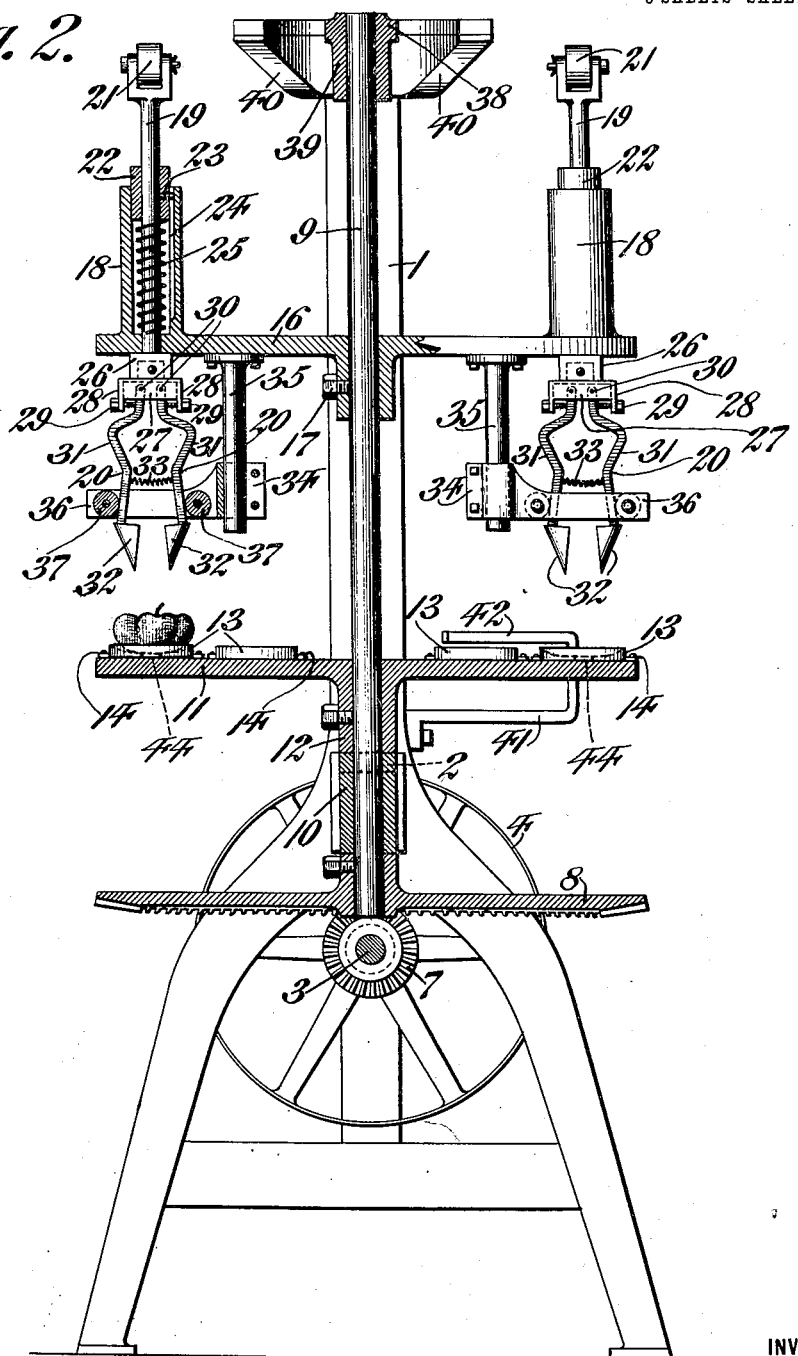

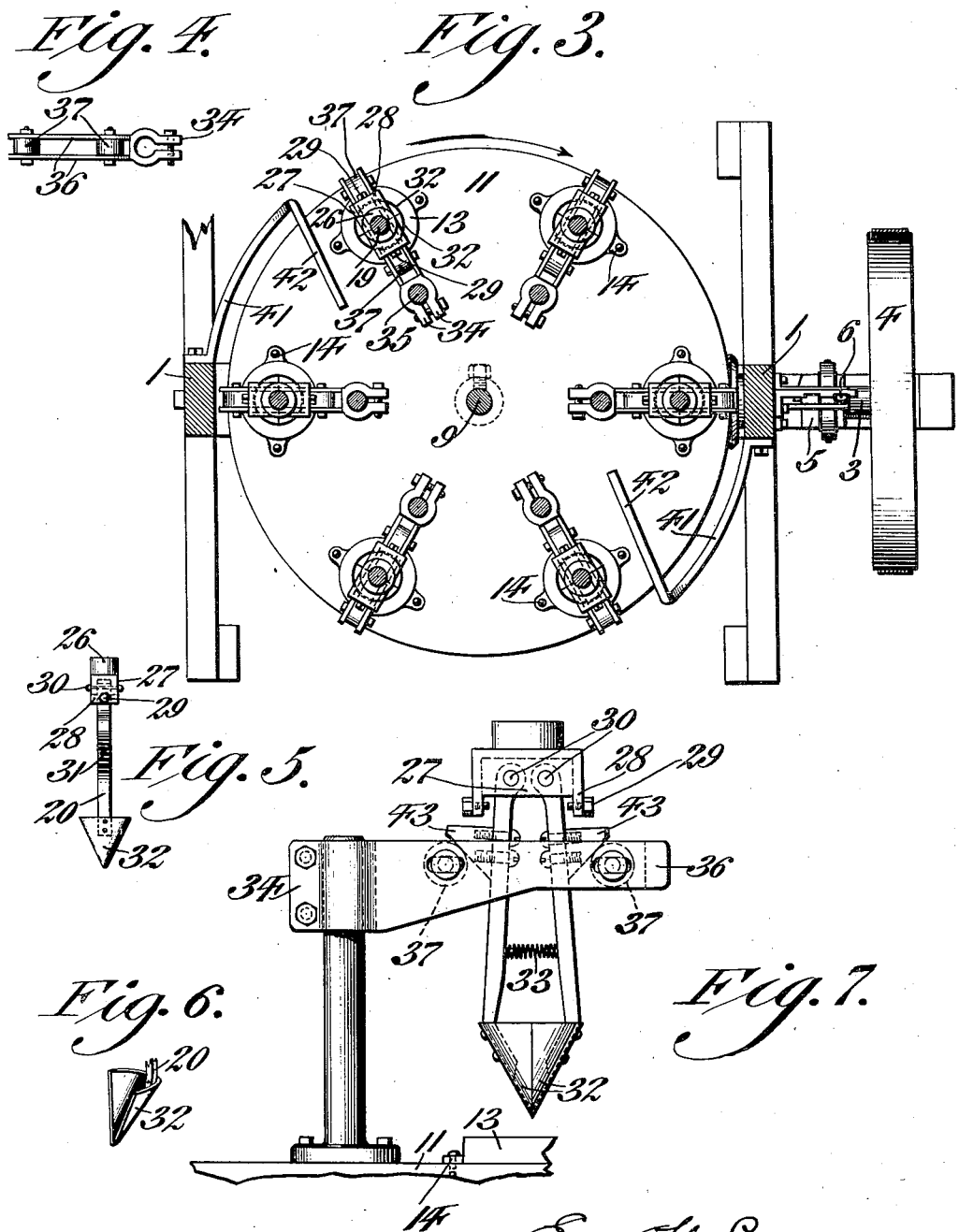

EZRA H. SAWYER, OF VINELAND, NEW JERSEY, AND MAURICE FELS, OF PHILADELPHIA, PENNSYLVANIA.

CORER FOR TOMATOES AND OTHER VEGETABLES.

1,016,039.  Specification of Letters Patent.  Patented Jan. 30, 1912.

Application filed September 9, 1911. Serial No. 648,476.

*To all whom it may concern:*

Be it known that we, EZRA H. SAWYER and MAURICE FELS, both citizens of the United States, residing in Vineland, Cumberland county, New Jersey, and in the city and county of Philadelphia, State of Pennsylvania, respectively, have invented a new and useful Corer for Tomatoes and other Vegetables, of which the following is a specification.

Our invention consists of a novel construction of a fruit or vegetable corer, adapted to remove the cores from fruit or vegetables, such as tomatoes, apples or the like, or to remove the eyes from pineapples or spots or the like from other fruits or vegetables, in which a coring implement is automatically fed to and from the articles to be cored as the latter are fed into alinement with the same.

It further consists of a machine for automatically feeding fruits or vegetables, such as tomatoes, apples, pineapples and the like to a coring implement which automatically engages and cuts out the core.

It further consists of a coring implement composed of a plurality of segments of a conical shell and of automatic means for moving such implement toward and from the article to be cored and for closing and opening such segments during such toward and from movement.

It further consists of other novel features of construction, all as will be hereinafter fully set forth.

The annexed drawings and the following description set forth in detail one mechanical form embodying our invention, such detail construction being but one of various mechanical forms in which the principle of the invention may be used.

Figure 1 represents a side elevation of a coring machine embodying our invention. Fig. 2 represents a vertical section of the same. Fig. 3 represents a section on line x—x of Fig. 1. Fig. 4 represents a detail of one of the guides for the coring implement. Fig. 5 represents a detail of one of the coring implements. Fig. 6 represents a perspective of one of the coring cutters. Fig. 7 represents a side elevation of a modified form of coring implement and support therefor.

Similar numerals of reference indicate corresponding parts in the figures.

Referring to the drawings:—1 designates standards or side bars comprising with the cross-bar, 2, a supporting frame for the operating mechanism, in which is rotatably mounted a main shaft, 3, carrying thereon a driving pulley, 4, from which it receives motion by means of a clutch, 5, slidably mounted and operated by means of a hand lever, 6, all of which clutch construction is familiar to those skilled in the art, and it is not deemed necessary to go into a detailed description thereof, as any suitable clutch may be employed to transmit the motion of the driving pulley to the shaft.

7 designates a gear fixedly secured on the shaft 3, and in mesh with a gear, 8, fixedly secured to a vertical shaft, 9, having a bearing in a hub, 10, carried upon the cross-bar.

11 designates a continuous feeding device, in the present instance comprising a table suitably mounted for rotation with the vertical shaft and provided with a hub 12, supported by the cross-bar. This table serves as a support for the articles to be cored, and is provided with a plurality of receptacles, 13, each of which is preferably secured to the table by means of fastening devices, 14. These receptacles are preferably provided with a cupped surface, 15, in which the article is placed by the operator of the machine ready to be operated upon by the coring implement, and the cupped portion is preferably centrally recessed, as at 44, to center and firmly hold the article being cored.

The coring mechanism is suitably positioned above the table and comprises a disk, 16, fixedly secured to the vertical shaft by means of a set screw, 17, or the like, and is preferably provided with a plurality of tubular guides, 18, each of which is located substantially in alinement with the path of movement of the article receptacles carried by the table.

19 designates a plunger preferably disposed within each tubular guide and having its end projecting exterior thereof in order to provide for attachment and operation of the corer implements 20, one pair of which is secured to one end of the plunger, while the opposite end of the same plunger carries a cam roller, 21, adapted to be engaged by a suitable cam hereinafter to be described. Each plunger has a sleeve, 22, secured thereto by means of a set screw, 23, which latter projects into a groove, 24, of the tubular guide, thereby preventing turning movement between the two parts but permitting the desired sliding movement of the plunger, it being understood that the same is moved in one direction by the cam mechanism and in the opposite direction by means of a spring, 25, which serves as a means to return the parts to normal position.

26 designates a head secured to each plunger and provided with depending flanges, 27 and 28, the former serving as a supporting means for the coring arms, while the latter carries stop-screws, 29, for limiting the movement of the arms and also for adjusting their spreading movement. The arms are preferably pivoted, at 30, to the flanges 27, and are formed with outwardly diverging angular bends or cams, 31, intermediate their ends and oppositely disposed with respect to each other. Each arm terminates in a coring knife or cutter, 32, which has the shape of one half of an axially divided conical shell, and the two coring arms are slightly diverging from a point below their cam portions, so that the straight cutting edges of the scoops or cutters will be brought completely together when the arms are closed, the blades thus forming segments of a conical shell. Normally, each pair of coring arms is maintained spread and with the cutters in open position, as shown in Fig. 2, through the medium of a spring, 33, disposed therebetween and bearing against each arm.

34 designates a bracket adjustably mounted on a hanger, 35, secured to the disk, and said bracket consists of side bars, 36, between which are rotatably mounted a pair of rollers, 37, said rollers being spaced a suitable distance apart to receive a pair of the coring arms comprising one of the coring implements. It will, of course, be understood that there is a bracket for each pair of coring implements and they are all arranged in a like manner and the description of one is thought to be sufficient for all.

38 designates a top-bar secured to the standard and having a journal, 39, in which the vertical shaft rotates. This top-bar serves as a support for a pair of cams, 40, suitably positioned in the path of movement of the cam-rollers, which are normally forced upward by the spring in the tubular guides, so that each plunger will be depressed when its roller engages a cam. Curved arms, 41, are secured to the standards and have their outer ends bent rectangularly upward and then again inward, above the revolving table, to form guides or ejectors, 42, oblique to the line of travel of the cup-shaped receptacles upon said table, to engage the fruits or vegetables in said receptacles and guide them outward over the edge of the rotating table, where suitable receptacles may be provided for their reception.

In Fig. 7 is illustrated a slightly different form of the coring implement, in which the cams 31 are substituted by two cam plates, 43, having upwardly diverging edges, but otherwise performing their function like the bent cam-portions of the arms.

The purpose of the cam 40 and the roller 21 is to cause the up and down movement of the coring implement 20 relative to the bracket 36 and to rollers 37, since the essential feature is that there shall be relative movement between the parts above referred to.

In Fig. 7 the coring implement is stationary and the bracket 36 is secured to the table 11, which may be reciprocated in its relation to the coring implement by any suitable means, not here illustrated, as they form no part of the present invention and would be within the knowledge of the ordinary mechanic to provide.

The illustrated form of the machine is particularly adapted for coring tomatoes, but may be employed for gouging portions of other fruits or vegetables, such as, for instance, removing the eyes from pineapples, the receptacles or supports for the article being shaped and sized to accommodate the same.

When the machine is in operation, the tomatoes or whatever articles are to be cored are placed upon the empty supports with the stem-ends facing upward and are successively carried beneath the plungers and their coring implements. When a plunger registers with a cam, the plunger is depressed by the cam and the cutters enter the article in their separated position, being gradually brought together as they descend, thus gouging a conical piece out of the article. As the inclines of the cams upon the coring arms are parallel with the inclines of the outer sides of the cutters, the latter will close together following the converging lines of the cut so that the core or plug cut out of the article will be a cone corresponding to the conical interior of the closed cutting blades. As the table rotates after the plunger has descended and started its ascent, the cored article strikes the ejector and is guided over the edge of the table into a suitable receptacle. New articles may continually be placed in the empty receptacles upon the table, so that the operation of the machine will be continuous.

It is evident that any number of coring devices may be employed in connection with the continuous carrier or feeding device.

Having thus described our invention, what we claim as new and desire to secure by Letters Patent, is:—

1. In a device of the character stated, a coring implement composed of a plurality of cutter blades forming segments of a conical shell, means for moving such implement toward and from the articles to be cored, and means for closing and opening such blades during their movement respectively toward and from such article.

2. In a device of the character stated, a coring implement composed of a plurality of cutter blades forming segments of a conical shell, means for automatically moving such implement toward and from the article to be cored, and means for automatically closing and opening such blades during their movement respectively toward and from such article.

3. In a device of the character stated, a coring implement composed of a plurality of cutter blades forming segments of a conical shell, means for automatically moving such implement toward and from the article to be cored, means for automatically closing and opening such blades during their movement toward and from such article, a continuous carrier having receptacles for the articles to be cored and supported to have such receptacles successively register with the coring implement, and means for automatically moving such carrier.

4. In a device of the character stated, a continuous carrier constructed to receive the articles to be cored, means for moving such carrier, arms provided with converging cutter-blades, means for reciprocating such arms toward and from the carrier, and means for moving such arms to bring the cutter blades toward and away from each other during descent and ascent of said arms.

5. In a device of the character stated, a continuous carrier constructed to receive the articles to be cored, means for moving said carrier, arms provided with cams and having converging cutter-blades at their ends, rollers arranged to have said cams bear against them, and means for reciprocating said arms toward and from the carrier, whereby said arms and cutter-blades are closed and opened during descent and ascent of the same.

6. In a device of the character stated, a continuous carrier having receptacles for the articles to be cored, guides supported to register with such receptacles, means for moving such guides in a direction parallel with that of the carrier and in unison with the same, plungers in said guides, cams arranged to engage said plungers to move them toward and from said receptacles, arms movably supported upon said plungers and having converging cutter-blades at their free ends, and means for closing and opening said arms and blades during their movement toward and from the carrier.

7. In a device of the character stated, a continuous carrier having receptacles for the articles to be cored, guides supported to register with such receptacles, means for moving such guides in a direction parallel with that of the carrier and in unison with the same, plungers in said guides, cams arranged to engage said plungers to move them toward and from said receptacles, arms movably supported upon said plungers and provided with cams, converging cutter-blades upon the ends of said arms, and rollers supported to have the cams of the arms bear against them, whereby said arms and blades are closed and opened during their movement toward and from the carrier.

8. In a device of the character stated, a continuous carrier having receptacles for the articles to be cored, guides supported to register with such receptacles, means for moving such guides in a direction parallel with that of the carrier and in unison with the same, plungers in said guides, cams arranged to engage said plungers to move them toward and from said receptacles, arms movably supported upon said plungers and provided with outwardly diverging cams, springs for opening said arms, converging cutter-blades upon the ends of said arms, and rollers supported to have the cams of the arms bear against them, whereby said arms and blades are closed by the cams and rollers when moved toward the carrier and spread open by the springs when moved away from the carrier.

9. In a device of the character stated, a plunger having means for reciprocating it, a pair of arms pivoted at their ends to said plunger and provided with diverging cams, converging cutter-blades upon said arms and having an incline parallel with that of the cams, a spring between the arms to spread the same, and rollers supported to bear against the inclines of the cams to close the arms and cutters when the latter are moved in one direction.

10. In a device of the character stated, a plunger having means for reciprocating it, a pair of arms pivoted at their ends to said plunger and provided with diverging cams, converging cutter-blades upon said arms, a spring between the arms to spread the same, and rollers supported to bear against the inclines of the cams to close the arms and cutters when the latter are moved in one direction.

11. In a device of the character stated, a coring implement composed of a plurality of cutter-blades forming segments of a conical shell, a receptacle for the article to be cored, means for moving one of said elements toward and from the other, and means for closing and opening such blades respectively during the movement of one of said elements toward and from the other.

12. In a device of the character stated, a coring implement composed of a plurality of cutter-blades forming segments of a conical shell, a continuous series of receptacles for the articles to be cored, means for moving one of said elements toward and from the other, means for moving said carrier to successively bring said receptacles in register with the coring implement, and means for closing and opening the blades of the coring implement respectively during the movement of one of the two first-recited elements toward and from the other.

13. In a device of the character stated, a coring implement consisting of a plurality of blades forming a tapering shell, a receptacle for the article to be cored, means for moving one of said elements toward and from the other, and means for closing and opening said blades respectively during the movement of one element toward and from the other.

14. In a device of the character stated, a coring implement comprising a plurality of members adapted to be moved toward and away from each other, a continuous series of receptacles for the articles to be cored, means for moving one of said elements toward and from the other, means for successively bringing each of said receptacles and the coring implement in register, and means for imparting operative movement to such coring implement.

EZRA H. SAWYER.
MAURICE FELS.

Witnesses:
H. S. FAIRBANKS,
C. D. McVAY.